United States Patent [19]

Mourgue

[11] 4,163,537

[45] Aug. 7, 1979

[54] BEARER STRUCTURE FOR ASSEMBLING MODULAR ELEMENTS

[75] Inventor: Pascal N. Mourgue, Paris, France

[73] Assignee: Societe Anonyme des Ateliers Marcadet Mobilier, Le Blanc Mesnil, France

[21] Appl. No.: 813,466

[22] Filed: Jul. 7, 1977

[30] Foreign Application Priority Data

Jul. 12, 1976 [FR] France .................................. 76 21360

[51] Int. Cl.² .............................................. F16S 3/00
[52] U.S. Cl. .............................. 248/188.1; 248/222.1; 248/295 A
[58] Field of Search ............... 248/188.1, 222.1, 223.4, 248/243, 244, 245, 246, 295

[56] References Cited

U.S. PATENT DOCUMENTS

| | | | |
|---|---|---|---|
| 1,632,036 | 6/1927 | Mullen | 248/295 A |
| 3,111,723 | 11/1963 | Bates | 248/244 X |
| 3,143,981 | 8/1964 | Tassell | 248/243 X |
| 3,178,775 | 4/1965 | Tassell | 248/245 X |
| 3,250,584 | 5/1966 | Tassell | 248/245 X |
| 3,351,313 | 11/1967 | Guillon | 248/246 |
| 3,462,110 | 8/1969 | Cheslock | 248/245 X |
| 3,485,189 | 12/1969 | Marco | 248/243 X |
| 3,490,393 | 1/1970 | Nelson | 248/243 X |
| 3,901,164 | 8/1975 | Urti | 248/245 X |

FOREIGN PATENT DOCUMENTS

| | | | |
|---|---|---|---|
| 1959249 | 10/1966 | Fed. Rep. of Germany | 248/295 |
| 7341203 | 6/1975 | Fed. Rep. of Germany | 248/295 |
| 2067125 | 8/1971 | France | 248/295 |
| 2215128 | 8/1974 | France | 248/295 |

*Primary Examiner*—William H. Schultz
*Attorney, Agent, or Firm*—Oblon, Fisher, Spivak, McClelland & Maier

[57] ABSTRACT

The structure comprises uprights constituted by cylindrical sectional elements with grooves parallel to the axis of the sectional element and distributed regularly at the periphery. Connecting members comprise a part engageable and lockable in said grooves at the desired height and a projecting part on which the end of a cross-piece is fixed supporting various constituent modular elements for desks of various configurations. The structure is applicable to the production of conventional desks, passaged or partitioned desks.

11 Claims, 3 Drawing Figures

BEARER STRUCTURE FOR ASSEMBLING MODULAR ELEMENTS

BACKGROUND OF THE INVENTION

1. Field of the Invention

The present invention relates to an improved bearer structure specially designed to serve as a framework for the construction, by means of modular elements, of conventional office units, (offices or desks) with passages (or with open spaces) or partitioned.

2. Description of the Prior Art

Systems known at present do not permit, the construction, by the combinations of the same basic elements, of groups of office units such as conventional office units, which have passages (or open spaces), or which are partitioned.

It is an object of the present invention to overcome this drawback.

It is another object of the present invention to provide a structure of simple design enabling, by the addition of standard modular elements (caissons, trays, partitions, shelves, etc...), the construction of groups of extremely varied office units.

GENERAL DESCRIPTION OF THE INVENTION

Accordingly, the present invention provides a bearer structure for assembling modular elements characterised in that it comprises uprights constituted by cylindrical sectional elements with grooves parallel to the axis of the sectional elements and distributed regularly at the periphery and connecting members comprising a part engageable and lockable in said grooves at the desired height and a projecting part on which is fixed the end of a cross-piece supporting the various constituent modular elements for office units of diverse configurations.

Advantageously, four grooves are provided, for example T shaped, shifted angularly by 90°, and said connecting members are straight, that is to say their projecting part is in the plane of symmetry of the T-groove, or angled. In the latter case, the axis of said projecting part of the connecting member forms with the plane of symmetry of the T-groove, an angle, for example of 30°, 45° or 60°.

With such a system it is possible to construct very numerous combinations through the multiple possibilities of "leading out" in several directions from each constant.

The uprights according to the invention may also be provided with special fittings at the ends enabling the fixing of auxiliary partitions or sub-partitions.

Other features and advantages will emerge from the following description of a preferred embodiment of the invention, which description is given purely by way of example and with respect to the accompanying drawings.

DESCRIPTION OF A PREFERRED EMBODIMENT

Figure 1:
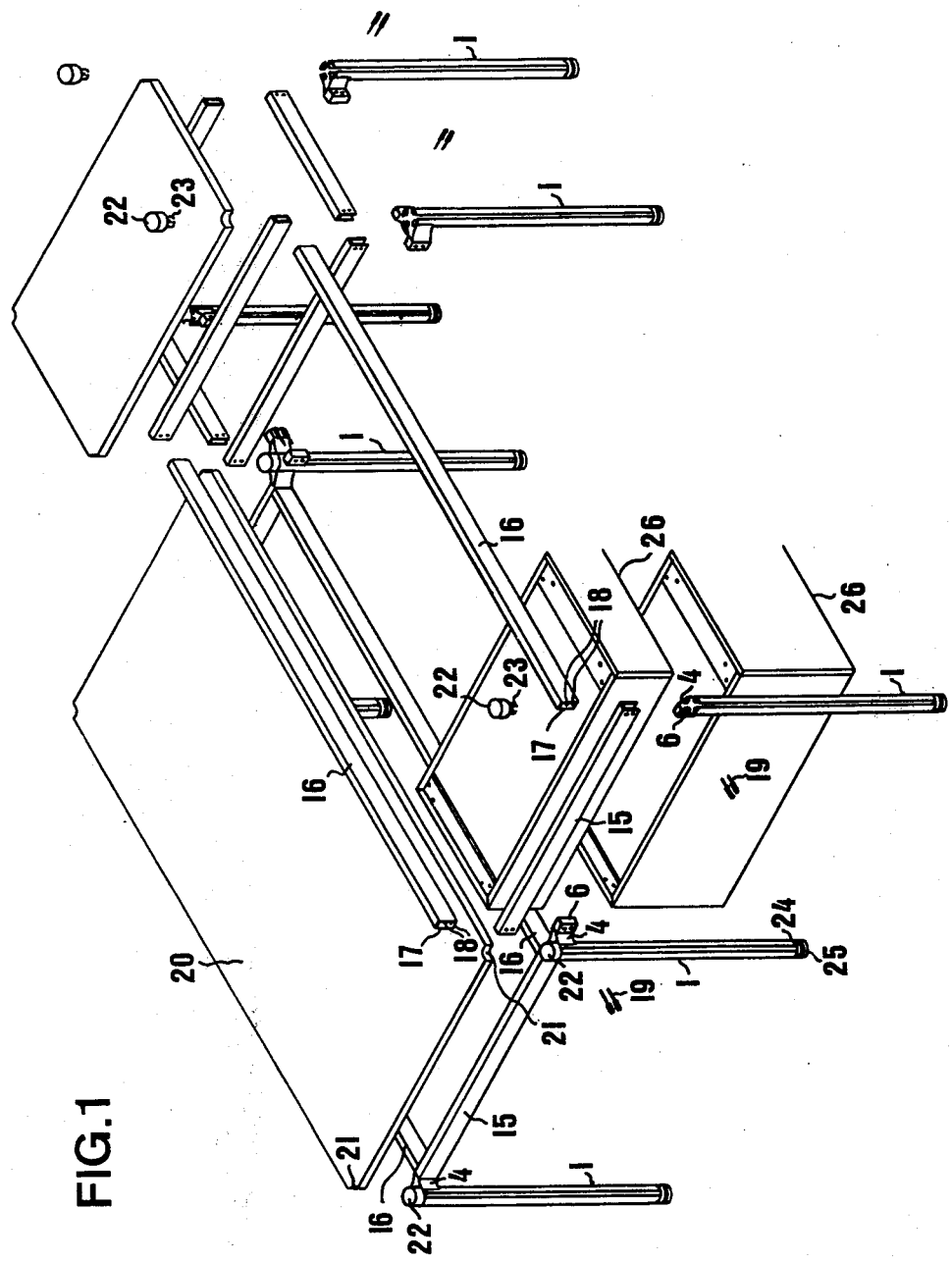
FIG. 1 shows a perspective view of one embodiment of a structure according to the invention illustrating various possibilities of the mounting of modular elements.

The basic members of the bearer structure according to the invention will first be described with reference to FIG. 2.

In this Figure, at 1 is shown a cylindrical upright constituted by a sectional element, for example of aluminum, having longitudinally and at its periphery four identical T shaped grooves 2 shifted angularly by 90°.

The upright 1 is hollow and includes in particular a polygonal central passage 3 enabling the passing of cables or pipes or the like if necessary, supplying accessories based on the modular elements borne by the upright one or fixed on these elements.

Each groove 2 can receive connecting members denoted generally by the reference numeral 4.

These members comprise two parts, one 5 including the means of insertion in the grooves and the other 6 comprising fixing means for supporting sectional elements for trays, cassions, shelves, etc...

The surface of the part 5 turned towards the upright 1 is cylindrical in order to mate with the upright 1 and includes centering ribs 7 fitting into the grooves 2. The part 5 includes two drillings in which two bolts 9 are engaged perpendicularly to the axis of the upright 1 when the connectors 4 are in position.

In order to facilitate the positioning of the connectors 4 in height along the upright 1, a series of drillings 10 is provided in the partition separating the grooves 2 from the central passage 3, in which the end of the bolts 9 are engaged. On the latter, are screwed gibs 11 of a particular hexagonal shape whose width is slightly less than that of the orifice of the grooves so that when the gibs 11 are engaged in the widened part of a groove 2, the rotation of the bolts 9 the heads of which are reached through the drillings 12, causes the gibs 11 to rotate which positions them cross-wise and blocks them until complete clamping of the connector 2, the gibs 11 no longer then being able to come out of the groove.

The part 6 of the connectors 4 has a generally parallelepipedic section and is oriented at 45°, for example, relative to the vertical middle plane of the part 5.

The part 6 serves as a tenon engageable in the end of a hollow cross-piece as will be seen below, fastening screw receiving holes 13 being formed in this part 6.

Figure 2:
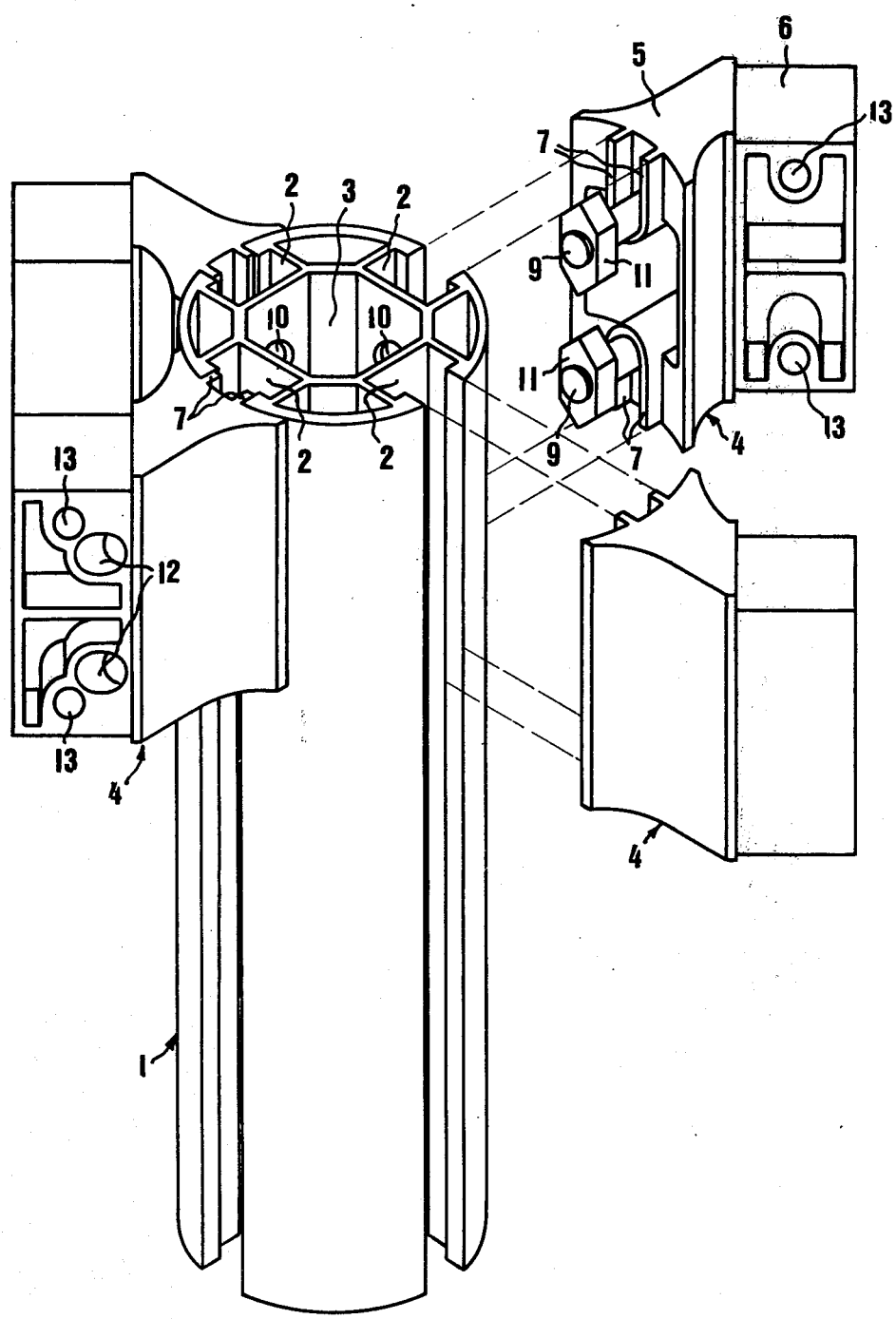
FIG. 2 shows a perspective view of the basic arrangement of the device according to the invention, that is to say an upright and its connecting members.

FIG. 1 illustrates an embodiment of an office unit constructed by means of the device of FIG. 2.

To constitute, for example, a working top of a desk unit, four uprights 1 are arranged and connected in the following manner.

Laterally the support legs constituted by two of the uprights are connected together by a cross-piece 15 formed by inverse U sectional element engaged through its ends on the projecting part 6 of the connectors 4.

Longitudinally, the connection is formed by two other hollow sectional elements 16 of rectangular cross-section and provided internally with a fitting 17 at each end pierced by two threaded holes 18.

In these holes 18 are engaged the fastening screws 19 of the cross-pieces 15 on the connectors 4. On the thus constituted rigid frame is positioned a plate 20 fixed by screws (not shown) to the sectional elements 15, 16.

At each corner, the plate is cut out circularly at 21 to permit the positioning, at the end of each upright 1, of an upper fitting 22 including a cylindrical head of the same diameter as the upright 1 with a ribbed base 23 of the same cross-section as the central passage 3 of the upright and ensleeved fast in the latter.

At the lower part of the uprights 1 are provided lower fittings 24 with a cylindrical head and a jack 25 of conventional design screwed in a tapped hole formed for this purpose in the lower fitting 24.

Modular caissons 26 with small or large drawers can be fixed by screws on the sectional elements 16.

Several caissons 26 may be stacked by being fastened to one another by a screw and nut system.

To produce a simple desk or a conventional desk, a single groove 2 of each upright 1 is used since the sectional elements 15 and 16 are fixed to the same connector 4. The other grooves can receive other connectors 4 enabling the number of connectors which an upright can support to be multiplied with a view to adjoining identical modular equipment or accessories (for example a 90° return for a typing desk) according to a wide variety of combinations.

In the drawings, bent connectors 4 are shown but it is also possible to provide straight connectors whose projecting parts 6 are in the extension of the parts 5. It is also possible, according to particular applications, to provide connectors bent at 60° or 30°, which further multiplies the possibilities of arrangement.

Above the working top of the desk may also be provided a screen on one side by extending the legs to a greater height on which the screen is fixed.

The fixing of this screen 30 (FIG. 3) is done by lugs 31 fast to the upper corners of the screen 30 provided with an arcuate vertical rim 32 turned downwardly and intended to be engaged in a circular groove 33 formed on the outer surface of a jack fitting 34 ensleeved on the end of the upright 1.

The rim 32 is clamped in the groove 33 by a jack 35 screwed in a tapped hole 36 of the fitting 34.

Figure 3:
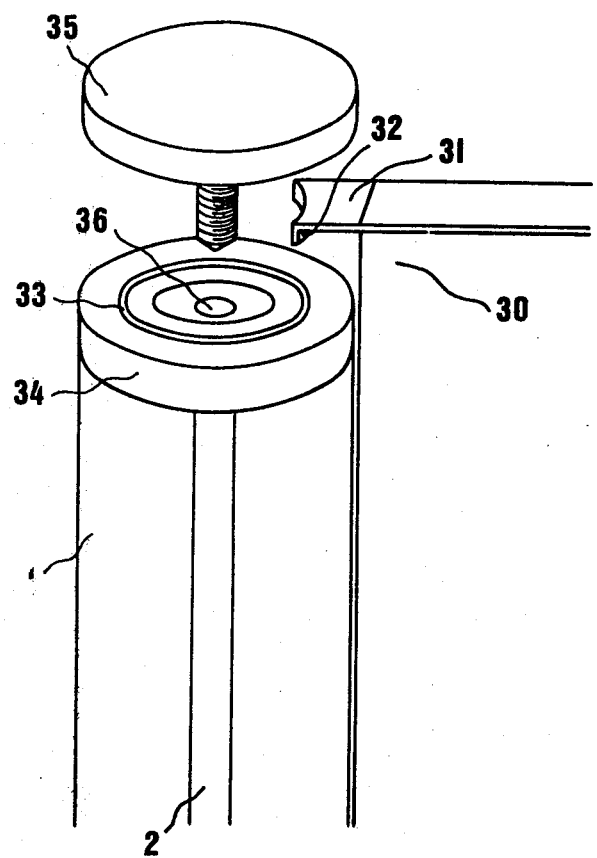
FIG. 3 shows a perspective view of a means for fixing a partition on the framework according to the invention.

For constructing partitioned desks, partitions of suitable structure are used provided with means for fastening to uprights identical to those of FIG. 3.

The drillings 10 formed in the uprights can also serve for fastening shelves of modular sheet metal elements with or without curtain closing, or electrical plinths.

Finally, the invention is not limited to the embodiment shown and described above but covers on the contrary all modifications, notably those regarding the number, the arrangement or the shape of the grooves of the uprights.

I claim:

1. A bearer structure for assemblying modular elements, comprising:
   uprights constituted by cylindrical sectional elements having T grooves parallel to the axes of the sectional elements and regularly distributed at the periphery, said T-grooves being symmetrical about a plane containing the axes of the sectional elements, and said uprights having a central hollow; and members connecting said uprights, said connecting members comprising a part engageable and lockable in said grooves at the desired height, a projecting part, and a cross-piece fixed at its end to said projecting part, said cross-piece supporting various constituent modular elements for office units of various configurations;
   wherein the wall separating the grooves from the central hollow of the sectional elements is pierced by positioning and fixing holes in which are engaged the ends of bolts passing through the connecting members; and
   wherein the ends of said uprights are adapted to receive cylindrical end fittings and screw jacks, said cylindrical end fittings and screw jacks having clamped therebetween, at an upper part of said uprights, lugs connected to a partition.

2. Bearer structure according to claim 1, wherein said sectional elements of the uprights comprise four T-grooves shifted angularly by 90°.

3. A bearer structure according to claim 2, wherein the projecting parts of the connecting members are in the plane of symmetry of the T-groove.

4. A bearer structure according to claim 2, wherein the part of the connecting members engageable and lockable in the grooves comprises a surface turned towards the grooves which is cylindrical and provided with guide and lateral positioning means for the connecting members in the grooves.

5. A bearer structure according to claim 4, wherein the connecting members comprise means for locking the connecting members in the grooves constituted by said bolts passing through the connecting members the bolts provided with gibs engagable with the grooves and supportable against the shoulders of the grooves.

6. A bearer structure according to claim 2, wherein the projecting parts of the connecting members form an angle with respect to the plane of symmetry of the T-groove.

7. A bearer structure according to claim 6, wherein said angle is 45°.

8. A bearer structure according to claim 1, wherein the projecting parts of the connecting members form an angle with respect to the plane of symmetry of the T-groove.

9. A bearer structure according to claim 1, wherein the projecting parts of the connecting members are in the plane of symmetry of the T-groove.

10. A bearer structure according to claim 8, wherein said angle is 45°.

11. A bearer structure according to claim 1, wherein said cross-pieces have hollow ends and wherein the projecting parts of the connecting members constitute tenons on which the hollow ends of said cross-pieces pieces are engaged thereby forming the framework of an office unit, said tenons including means for fixing said cross-pieces to said tenons.

* * * * *